United States Patent [19]

Keller

[11] Patent Number: 4,945,668

[45] Date of Patent: Aug. 7, 1990

[54] ICE FISHING APPARATUS WITH HEATING CHAMBER

[76] Inventor: Cyril N. Keller, Rte. 3, Box 405, Fergus Falls, Minn. 56537

[21] Appl. No.: 128,595

[22] Filed: Dec. 4, 1987

[51] Int. Cl.⁵ ............................................. A01K 97/12
[52] U.S. Cl. ........................................................ 43/17
[58] Field of Search .......................... 43/17, 4, 16, 19.2

[56] References Cited

U.S. PATENT DOCUMENTS

| | | | |
|---|---|---|---|
| 2,618,091 | 11/1952 | Sheraski | 43/17 |
| 2,677,363 | 5/1954 | Bryan | 43/4 |
| 2,785,493 | 3/1957 | Theil | 43/17 |
| 2,883,784 | 4/1959 | Obernolte | 43/4 |
| 3,010,238 | 11/1961 | Crumrine, Jr. et al. | 43/16 |
| 3,025,852 | 3/1962 | Quilling | 43/4 |
| 3,030,122 | 4/1962 | Madera | 43/4 |
| 3,105,487 | 10/1963 | Anderson | 43/4 |
| 3,163,954 | 1/1965 | Westin | 43/17 |
| 3,170,458 | 2/1965 | Anderlie | 43/4 |
| 3,387,401 | 6/1968 | Stelmach | 43/17 |
| 4,253,262 | 3/1981 | Johnson | 43/17 |
| 4,313,107 | 12/1978 | Godbout | 126/271.2 R |

OTHER PUBLICATIONS

Vogt, et al., "Ice Fishing Hot Box", advertisement.

*Primary Examiner*—M. Jordan
*Attorney, Agent, or Firm*—Moore & Hansen

[57] ABSTRACT

An ice fishing apparatus incorporating a housing with a heating chamber having a heat source such as a candle for preventing the formation of ice in an ice fishing hole as well as for preventing the freezing of the fishing reel. A tip up system is mounted on the housing so as to signal a fisherman that a fish has been hooked.

13 Claims, 1 Drawing Sheet

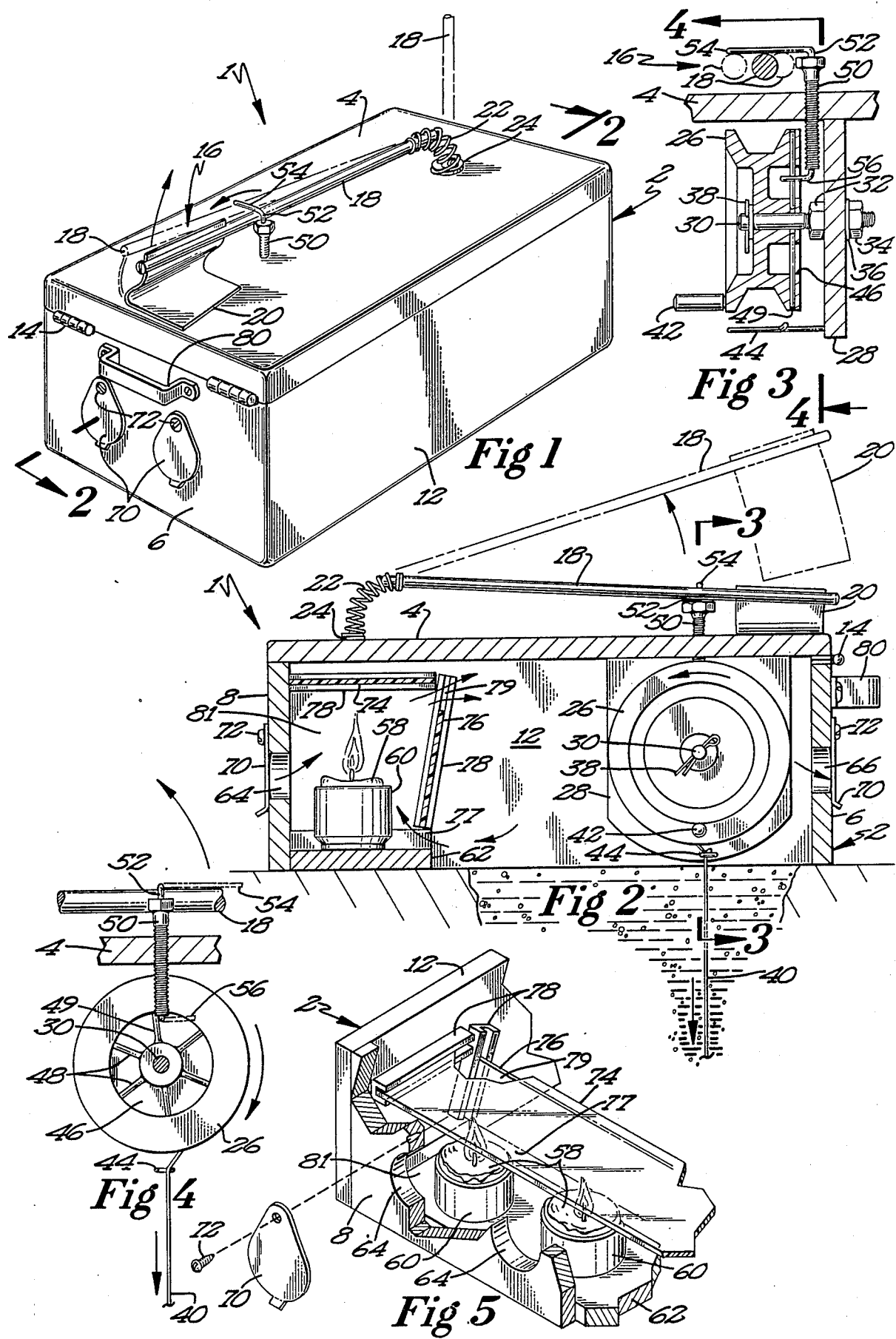

ICE FISHING APPARATUS WITH HEATING CHAMBER

BACKGROUND OF THE INVENTION

This invention relates to tip up systems for ice fishing — i.e., signalling devices for notifying the ice fisherman that a fish has hit at the lure — as well as to heating devices for keeping ice fishing holes free of ice and slush. Variations and some combinations of these devices have been developed but are frequently difficult to transport and/or operate.

There are essentially three major problems with which the ice fisherman must deal: 1. keeping ice from forming around his line in the hole; 2. keeping his reel from freezing after the line has gotten wet; and 3. keeping warm. While other inventions have attempted to solve one or another of these problems in various ways, the present invention directly deals with the first two, while leaving the fisherman free to deal with the third as he sees fit.

Some devices have been developed which do attempt to address all three of these problems. Stelmach U.S. Pat. No. 3,387,401 issued on June 11, 1968 is indicative of the state of the prior art. A pot loaded with a combustible fuel such as coal is used as a radiant heat source for keeping the water in an ice fishing hole from freezing. The same heat source warms water which flows through a coil to a location near the fishing reel to keep the reel from freezing. Additionally, a tip up mechanism is provided for notifying a fisherman that a fish has taken the bait.

Godbout U.S. Pat. No. 4,131,107 issued on Dec. 26, 1978 provides for a smaller, collapsible box containing a heat source which keeps ice from forming in the ice fishing hole. However, the Godbout device requires the presence of the fisherman to tend his line, and it provides: no means for preventing a fishing reel from freezing.

Finally, Johnson U.S. Pat. No. 4,253,262 issued on Mar. 3, 1981 provides an alternative method for maintaining the ice fishing hole free of ice; it offers a signalling mechanism; and it even provides a means to keep the reel from freezing. However, the entire unit must be lifted out of the hole to access the fishing reel, which is located beneath the surface of the water.

With this background in mind, an ice fishing apparatus with a tip up mechanism and a means for preventing the freeze-up of the fishing reel and the water in the ice fishing hole has been developed.

SUMMARY OF THE INVENTION

The ice fishing apparatus of this invention is especially notable for its small size, ease and simplicity of handling, and great usefulness. These factors are especially vital to a device intended for use in a harsh and hostile environment.

The central objectives of the invention are to provide a mechanism which prevents ice from forming in an ice fishing hole, prevents the fishing line from freezing on a take-up mechanism such as a reel or spool, and which signals an ice fisherman at a remote location that a fish has taken the bait.

These objectives are achieved by providing a generally box-shaped housing with a hinged cover which, when opened, allows access to the inside of the housing. A heat generating means such as two or three small candles rest on a shelf which makes up a part of the bottom surface of the housing, while the remainder of the bottom of the housing is left open. This open portion rests over the fishing hole which the ice fisherman has made in the ice. Above the opening in the housing, attached to the interior surface of the hinged cover, is a spool or reel holding the fishing line. Heat from the candles is directed at the reel and at the opening in the ice by means of a baffle system within the housing.

As a particularly advantageous feature, a signalling means in the form of a small flag, for example, is mounted to the exterior surface of the hinged cover. This signal is activated by a trip rod which extends through the hinged cover, allowing the pop-up flag, restrained in a horizontal position by a detent arm attached to the trip rod, to be released and extend to a vertical position upon rotation of the reel caused by a tugging at the fishing line by a fish.

A further objective of this invention is to provide a release system for the pop-up flag which is adjustable, allowing varying degrees of tension in the line to activate the trip rod and release the pop-up flag bar. This is achieved by providing a detent arm equal in length to several diameters of the pop-up flag bar. By restraining the pop-up flag bar in its horizontal position by placing it near the outer end of the detent arm, a greater amount of downward tension on the line is needed, as by a hooked fish, to release the signal than if the pop-up flag bar is placed in a restrained position near the inner end of the detent arm at a point near where the detent arm and trip rod are joined. The benefit of this feature is that false alarms caused by the use of relatively large bait fish, e.g., minnows, may be reduced by placing the pop-up flag bar at the higher tension position, while the lower tension position may be used when fishing for smaller fish such as crappies and using smaller bait.

These and other objects and advantages of the invention will be readily understood as the following description is read in conjunction with the accompanying drawings, wherein like reference numerals have been used to designate like elements throughout the several views.

BRIEF DESCRIPTION OF THE DRAWINGS

FIG. 1 is a perspective view of the ice fishing apparatus from the end containing the air outlet apertures;

FIG. 2 is a vertical section view showing the major components of the ice fishing apparatus taken along line 2—2 of FIG. 1;

FIG. 3 is a vertical section view taken along line 3—3 of FIG. 2 through the reel, pop-up flag bar and the top wall of the invention, showing the first and second detent arms as they are positioned when the pop-up flag bar is in the restrained position;

FIG. 4 is a vertical section view of the reel and a portion of the pop-up flag bar in the restrained position, taken along line 4—4 of FIG. 3; and FIG. 5 is a cutaway perspective view of the heat generating chamber of the preferred embodiment.

DESCRIPTION OF THE PREFERRED EMBODIMENT

With reference to the drawings, and in particular to FIGS. 1 and 2, the ice fishing apparatus of this invention is generally indicated by reference numeral 1. The housing 2 of the ice fishing apparatus 1, preferably made of wood, comprises a top wall 4, end walls 6, 8, and side walls 10, 12. End wall 6 is located opposite end wall 8, and side wall 10 is located opposite side wall 12. The top wall 4 is attached to end wall 6 by means of hinges 14 which allow top wall 4 to be lifted for access to the interior of the housing 2. While FIG. 1 illustrates the use of two hinges 14, a single hinge or several shorter hinges may also be used. In the preferred embodiment, the edges of the top wall 4 extend beyond the exterior surfaces of the housing 2 where the top wall 4 meets with end wall 8 and side walls 10, 12 to provide an easy means for gripping and raising top wall lid 4 to open and close the housing 2.

Attached to the exposed outer surface of the top wall 4 is a tip up assembly generally indicated by reference numeral 16. This tip up assembly 16 is comprised of a pop-up flag bar 18 holding a brightly colored flag 20. The pop-up flag bar 18 is joined to a spring 22 which is attached to the exposed outer surface of the top wall 4 by a fastening means such as a screw 24. In the preferred embodiment as disclosed, the pop-up flag bar 18 is made of a rigid material such as wood. Alternatively, the pop-up flag bar 18 may be made of a flexible, bendable material such as rubber and attached directly to the top wall 4 without the spring 22. Thus, when released from the restrained, or bent, position, the pop-up flag bar 18 would rise to an upright position due to its inherent flexural properties.

As is clearly shown in FIGS. 2-4, a reel 26 is suspended from the interior surface of the top wall 4 by fixing it to a reel mounting block 28 which is directly attached to the top wall 4, as by gluing. The reel 26 rotates about a reel mounting pin 30 which serves as the means by which the reel 26 is fixed to the reel mounting block 28. As illustrated in FIGS. 214 4, the reel mounting pin 30 may be threaded at one end and attached to the reel mounting block 28 by means of nuts 32, 34 and washer 36, making sure that the reel 26 is spaced apart from the reel mounting block 28 by at least the thickness of the nut 32 for reasons which shall be illustrated. The reel 26 is secured in place on the reel mounting pin 30 by means of a cotter pin 38. The reel 26 must be able to rotate freely about reel mounting pin 30 to allow for the easy dispensing and retrieving of the fishing line 40 about the reel 26. A small reel crank 42 is fixed to the side of the reel 26 opposite the reel mounting block 28 to provide a means for easily rotating the reel 26 while dispensing and retrieving fishing line 40. An eye hook line guide 44 is attached to the reel mounting block 28 below the reel 26 so as to accept the fishing line 40 in such a way as to minimize the tangling of the line 40 on the reel 26 and on adjacent components of the apparatus. As is more clearly shown in FIG. 4, the reel 26 is provided with an annular slot 46 located on the side of the reel 26 which faces the reel mounting block 28. Annular slot or recess 46 is coaxial with the rotational axis of the reel 26 defined by mounting pin 30. Annular slot 46 contains radially extending ribs 48, the function of which is set forth below.

As illustrated in FIG. 3, a trip rod sleeve 50 extends through the top wall 4 and is positioned between the reel 26 and the reel mounting block 28. In the preferred embodiment, the trip rod sleeve 50 is mounted perpendicular to the plane of top wall 4, and is also perpendicular to the reel mounting pin 30. Extending through the trip rod sleeve 50 is the trip rod 52. Above the trip rod sleeve 50 the trip rod 52 is bent at a right angle, the horizontal portion acting as a detent arm 54. At the other end of the trip rod sleeve 50 the trip rod 52 is bent at another right angle to form a second detent arm 56 which is formed so as to be parallel with the first detent arm 54, and which extends into annular reel slot 46. In the preferred embodiment, the length of the first detent arm 54 is equal to or greater than three diameters of the pop-up flag bar 18. (If the pop-up flag bar 18 is not cylindrical, the length of the first detent arm 54 should be at least three times the length of the longest cross sectional dimension of the pop-up flag arm 54).

Reference to FIGS. 1, 3 and 4 provides a clear understanding of the cooperative relationship between the reel 26, the trip rod 52, and the tip up assembly 16. After the fishing line 40 has been let out to the proper depth in the water through the ice fishing hole, the pop-up flag bar 18 is placed in a horizontal restrained position wherein the pop-up flag bar 18 is held under and in place by the first detent arm 54. Rotation of the trip rod 52 to properly position the first detent arm 54 simultaneously positions the second detent arm 56 within the annular slot 46 of the reel 26 and between the radially extending ribs 48. When a fish is hooked on a lure at the end of the fishing line 40, the reel 26 rotates about the reel mounting pin 30. The rotation of the reel 26 causes one of the radially extending ribs 48 to contact the second detent arm 56 and thereby rotate the trip rod 52 within the trip rod sleeve 50. Rotation of the trip rod 52 causes the first detent arm 54 to release the pop-up flag bar 18. As a result, flag bar 18 returns to an upright position under the influence of coil spring 22, signalling the ice fisherman that a fish is on the line and has, hopefully, been caught.

With reference to FIGS. 3 and 4, it is to be noted that in addition to, or as an alternative to, ribs 48, a pin 49 may be positioned on reel 26 to extend through annular slot 46. Rotation of the reel will cause pin 49 to strike detent arm 56 and thus rotate trip rod 52. The length of the first detent arm 54 allows the placement of the pop-up flag bar 18 at various positions along the length of the first detent arm 54. The usefulness of this capability lies in the fact that while the pop-up flag bar 18 is held in place in the horizontal restrained position by the first detent arm 54, the pop-up flag bar 18 exerts a leveraged upward force on the first detent arm 54, which in turn restrains the ability of the trip rod 52 to rotate. When the pop-up flag bar 18 is placed along the length of the first detent arm 54 at a position adjacent to the trip rod 52, the resulting resistance to rotation is less than when the pop-up flag bar 18 is placed under the first detent arm 54 at a position near the outer end thereof most distant from the trip rod 52. This ability to place the pop-up flag bar 18 in various positions along the length of the first detent arm 54 permits the ice fisherman to adjust the size and weight of his fishing bait or lure to various situations without risking an increase in false signals from the tip up assembly 16. For example, when an ice fisherman is using a relatively large live bait to attract larger fish, he would place the pop-up flag bar 18 in a position under the first detent arm 54 which would provide the greatest upward leveraged force and thereby the greatest resistance to rotation of the trip rod 52 —i.e., near the outer end of the first detent arm 54. However, if fishing for smaller fish with smaller bait, the pop-up flag bar 18 would be positioned near the inner end of detent arm 54 next to trip rod 52 in order to provide the least possible resistance to the rotation of the trip rod 52. Alternative, leveraged positions of the flag bar 18 are illustrated in phantom in FIGS. 1 and 3.

Heat is provided by a heat generating means located within the housing 2, such as by candles 58, although other heat sources may be used such as burning a wick in a small lamp fueled by lamp oil. In the preferred embodiment the candles are held in candle holders 60 which rest on a small shelf or bottom wall segment 62, which is fixed and located adjacent to the end wall 8 and extends between side walls 10 and 12. The remainder of the bottom portion of the housing 2 is open, with the opening extending from the edge of the bottom wall segment 62 to the end wall 6, and between the side walls 10 and 12. The reel 26 is located so as to be positioned immediately above this open bottom portion when the top wall 4 is in the closed position To ensure a supply of combustion air within the housing 2, air inlet apertures 64 and air outlet apertures 66 are provided in end walls 8 and 6, respectively, the air inlet apertures 64 being located in the end wall 8 adjacent to the bottom wall segment 62 holding the candles 58. To control the amount of air flowing through the inlet and outlet apertures 64 and 66, adjustable aperture covers 70 are provided. These aperture covers are attached to the end walls 6 and 8 by some fastening means such as a screw 72. Since no more air can flow out of the housing 2 through the air outlet apertures 66 than flows into it through the air inlet apertures 64, the adjustable aperture covers 70 are not required over the air outlet apertures 66 for proper operation of the invention.

Air flow within the housing 2 may be directed by the use of a baffle means comprised of a first baffle 74 positioned generally horizontally above the candles 58 and a second baffle 76 located in a generally upright position between the candles 58 and the open bottom portion of the housing 2. The baffles 74 and 76 are preferably made of metal and extend from side wall 10 to side wall 12. They are slidably removable and may be installed in grooved holders 78 mounted to the side walls 10 and 12, or alternatively grooves may be cut directly into side walls 10 and 12. The second baffle 76 is positioned in such a way that a space is provided between the bottom edge of the second baffle 76 and the surface of the bottom wall segment 62, thereby creating a first air flow passage 77 below the second baffle 76. The first baffle 74 is located in close proximity to the second baffle 76 so as to define a second air flow passage 79 above the second baffle 76. The second baffle 76 serves not only to help direct the flow of air but also to protect the top wall 4 from the heat of the flames of the candles 58. The resulting area enclosed within the space defined by the side walls 10, 12, the first baffle 74 and the second baffle 76, the end wall 8 and the bottom wall segment 62 is known as the heat chamber 81.

The existence of a heat source, in the form of candles 58, in combination with a heat sink, in the form of the ice and water below the open bottom portion of the housing 2, and the first and second baffles 74 and 76, sets up a convection flow system of the heated air through the first and second air passages and around the ice hole and reel within the housing 2, as indicated by the arrows in FIG. 2.

A handle 80 is provided on the outside of the housing 2, preferably on the end wall 6 as illustrated in FIGS. 1 and 2, for carrying the ice fishing apparatus 1.

It is anticipated that various changes may be made in the size, shape, and construction of the improved ice fishing apparatus disclosed herein without departing from the spirit and scope of the invention as defined by the following claims.

What is claimed is:

1. An ice fishing hole heating device for dispensing and retrieving fishing line and for signalling the presence of a fish on the line comprising:
    a housing having two opposed end walls, two side walls, a partially open bottom portion, and a hinged top wall, said hinged top wall being swingable between open and closed positions, and having an exposed outer surface and an interior surface;
    a pop-up flag bar attached to said exposed outer surface of said top wall and so constructed and arranged as to move from a generally horizontal restrained position to a normally upright signalling position upon release from said restrained position;
    a reel for holding fishing line mounted to said interior surface of said top wall of said housing, said reel being mounted to said top wall so as to be suspended over said partially open bottom portion when said hinged top wall is in said closed position, said reel being so mounted as to allow free rotation for said dispensing and retrieving of fishing line;
    a trip rod extending through an opening in said top wall in such manner as to be free to rotate within said opening, said trip rod having a detent arm for restraining said pop-up flag bar in said generally horizontal restrained position, and said trip rod having a portion thereof disposed within said housing and positioned so as to be actuated by said reel when said reel rotates so as to thereby rotate said trip rod and said detent arm and release said pop-up flag bar for movement to said normally upright signalling position; and
    heat generating means supported inside said housing.
2. An ice fishing hole heating device as defined in claim 1 wherein:
3. An ice fishing hole heating device as defined in claim 2 wherein:
    said housing further comprises a fixed bottom wall segment for holding said candle, said bottom wall segment being adjacent to said partially open bottom portion.
4. An ice fishing hole heating device as defined in claim 1 wherein:
    said pop-up flag bar is attached to said exposed outer surface of said top wall so as to allow said pop-up flag bar to pivot through a generally horizontal plane when said pop-up flag bar is restrained in said generally horizontal restrained position by said detent arm.
5. An ice fishing hole heating device as defined in claim 4 wherein:
    said pop-up flag bar exerts a leveraged upward force on said detent arm when restrained thereunder thereby restraining rotation of said trip rod; and
    said detent arm of said trip rod is of sufficient length that said pop-up flag bar may be pivoted in a generally horizontal plane to different angular positions under said detent arm to selectively adjust said leveraged upward force and a resulting resistance imposed by said pop-up flag bar on said trip rod.
6. An ice fishing hole heating device as defined in claim 1 further comprising:
    an eye hook line guide, mounted in fixed relation to said reel, through which passes said fishing line as it is wound onto or off of said reel.
7. An ice fishing hole heating device as defined in claim 1 wherein:
    at least one air inlet aperture and at least one air outlet aperture are provided in one of said walls of said housing, and at least one said air inlet aperture has an adjustable aperture cover for regulating air flow through said air apertures.

8. An ice fishing hole heating device as defined in claim 1 further comprising:
a handle attached to said exposed outer surface of said housing for easily carrying said device.

9. An ice fishing hole heating device as defined in claim 1 further comprising:
baffle means for directing the flow of heated air within said housing to prevent freezing of water in said ice fishing hole.

10. An ice fishing hole heating device as defined in claim 9 wherein:
said baffle means comprises a first baffle positioned generally horizontally above said heat generating means, and a second baffle in a generally upright position between said heat generating means and said partially open bottom portion so as to create a first air flow passage below said second baffle, said first and second baffles being located in close proximity so as to define a second air flow passage therebetween above said second baffle, whereby convection flow of heated air is induced inside of said housing in the region of said partially open bottom portion, said convection flow following a flow path through said first and second air passages.

11. An ice fishing hole heating device as defined in claim 14 wherein:
at least one side of said reel contains a annular slot coaxial with said reel, with said annular slot containing at least one radially extending rib to act as said detent release means.

12. An ice fishing hole heating device as defined in claim 1 and further including:
an air inlet aperture in said end wall located nearest said heat generating means, and an air outlet aperture in said end wall opposite said end wall containing said air inlet aperture.

13. An ice fishing hole heating device as defined in claim 1 wherein: said pop-up flag bar is attached to said top wall by spring means normally urging said flag bar to said normally upright signalling position.

* * * * *

UNITED STATES PATENT AND TRADEMARK OFFICE
CERTIFICATE OF CORRECTION

PATENT NO. : 4,945,668

DATED : August 7, 1990

INVENTOR(S) : Cyril N. Keller

It is certified that error appears in the above-identified patent and that said Letters Patent is hereby corrected as shown below:

In column 3, line 33, after "FIGS." change "214 4" to --2-4--.

In claim 2, following line 34, indent and add:

--said heat generating means consists of at least one candle.--

Signed and Sealed this

Thirty-first Day of December, 1991

Attest:

HARRY F. MANBECK, JR.

Attesting Officer

Commissioner of Patents and Trademarks